UNITED STATES PATENT OFFICE.

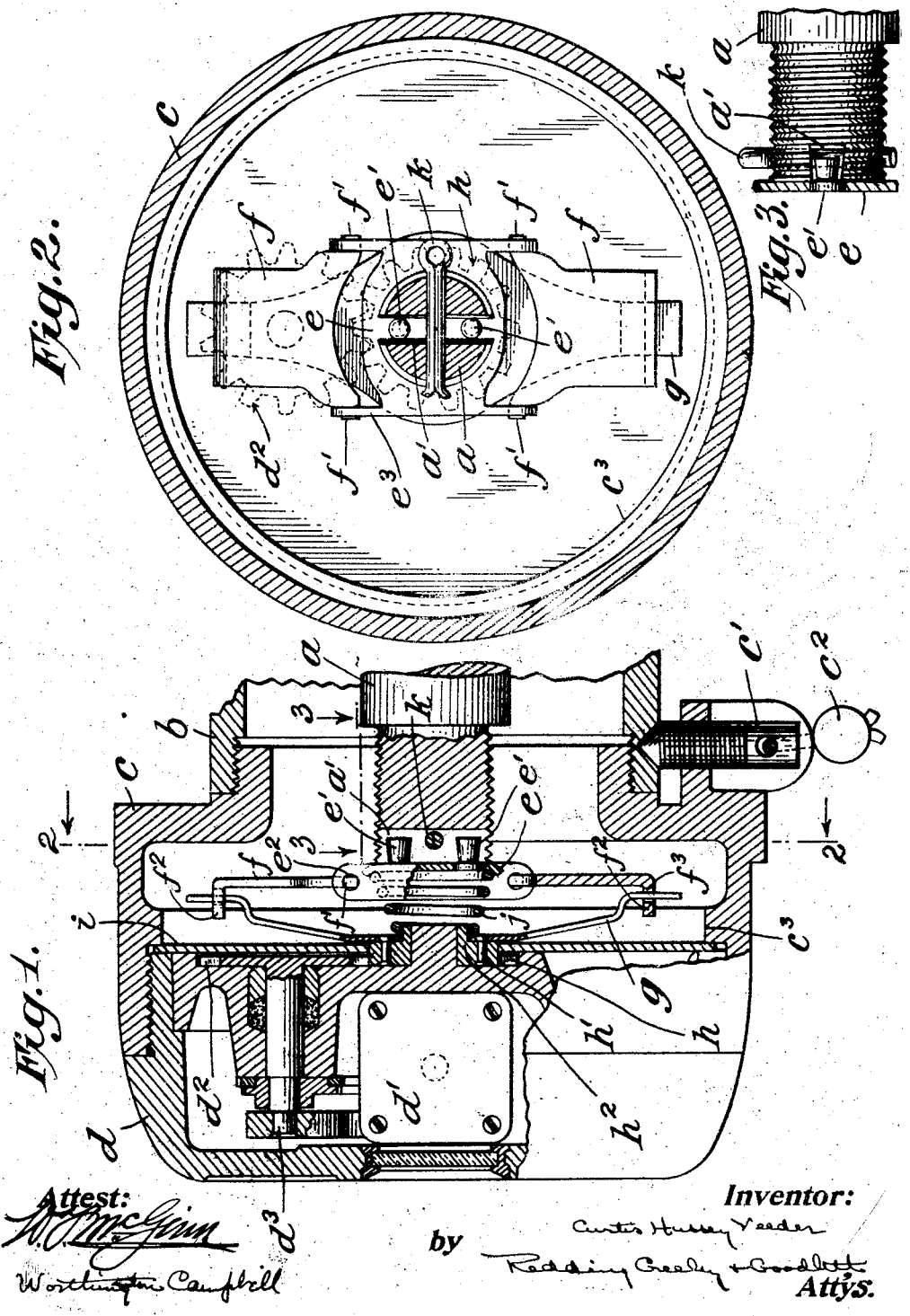

CURTIS HUSSEY VEEDER, OF HARTFORD, CONNECTICUT.

HUB-ODOMETER.

1,081,561.  Specification of Letters Patent.  Patented Dec. 16, 1913.

Application filed March 21, 1913. Serial No. 755,846.

*To all whom it may concern:*

Be it known that I, CURTIS HUSSEY VEEDER, a citizen of the United States, and a resident of Hartford, in the State of Connecticut, have invented certain new and useful Improvements in Hub-Odometers, of which the following is a specification, reference being had to the accompanying drawing, which forms a part hereof.

This invention relates to hub odometers and more particularly to the driving connections between a device of this character and the axle of the wheel on which the odometer is carried.

In the type of odometer with which this invention is used, the operating parts of the odometer, which is carried on and revolves with the wheel of the vehicle, are driven from the nonrevoluble axle on which the wheel is carried. In previous constructions the driving connections between the axle and the operating parts of the odometer have not been entirely satisfactory by reason of the relative lateral and longitudinal movement of the axle and the odometer casing for which no suitable compensating arrangement has been provided.

It is an object of this invention to improve generally the construction of the driving connection between the axle and the odometer whereby compensation for relative movement between the axle and the odometer due to loose bearings and kindred causes shall be made automatically and the operation of the odometer insured under the most adverse conditions of use.

A further object is to provide a suitable wall between the operating parts of the odometer and the bearings whereby the former are protected from foreign particles, grease, etc. which are always to be found in the bearings of vehicles.

The invention will be more particularly described with reference to the accompanying drawing in which—

Figure 1 is a fragmentary view in vertical section of an odometer of standard type showing its connection to the vehicle wheel and the improved driving connection between it and the axle. Fig. 2 is a sectional view taken on the plane indicated by the line 2—2 of Fig. 1 and looking in the direction of the arrows. Fig. 3 is a fragmentary view in plan looking in the direction of the arrows 3—3 in Fig. 1 and showing in detail the means for engaging positively the improved driving connection with the axle.

For a clear understanding of this invention it is desirable to refer here to the axle $a$, hub $b$, adapter $c$, cap $d$ and odometer $d'$, all of these parts being of any usual form. As will be understood, the axle $a$ of the vehicle to which the odometer is applied is usually nonrevoluble and carries thereon by suitable bearings (omitted here for the sake of clearness) the hub $b$ of the wheel. In some constructions the odometer cap or casing $d$ is secured directly to this hub but more modern practice approves the use of an adapter $c$ by which casings of standard dimensions may be applied to hubs of varying diameters. For the sake of completeness a suitable arrangement is herein illustrated by which the adapter may be sealed to the hub $b$ through the engagement of a set screw $c'$ carried by the adapter and engaging the hub. The withdrawal of the set screw $c'$ and removal of the odometer by unauthorized persons may be guarded against by the use of a seal $c^2$ passing through the body of the screw and engaging a part of the adapter.

From the foregoing brief description it will now be more readily appreciated that the operating parts of the odometer $d'$ are to be driven by relative movement thereof with respect to the axle $a$. Accordingly, it is necessary to provide an intermediate driving connection 'tween these parts. It is with the intermediate driving connection that this invention is primarily concerned. This connection includes a plate $e$ carrying pins or other suitable projections $e'$ in direct engagement with the axle $a$. In the present embodiment the plate $e$ is illustrated as carrying two pins $e'$ which are disposed in a transverse slot $a'$ cut in the end of the axle $a$. It will be understood, however, that other arrangements for securing the engagement of the plate with the axle $a$ may be employed. The plate $e$ has hingedly connected thereto links $f$ which may be struck up from sheet metal, in the interest of cheapness of manufacture. For instance, as illustrated herein, these links $f$ have formed at their inner ends and adjacent their side edges, lugs $f'$ which rest in corresponding recesses $e^2$ formed in suitable ears $e^3$ carried by the plate $e$. The construction above outlined insures a substantial and simple hinge connection between the links $f$ and the plate $e$.

The outer ends of the links $f$ are preferably flanged, as at $f^2$, and have formed therethrough slots $f^3$ to receive loosely the ends of an arm $g$. This last named arm may also be struck up from sheet metal and stamped to any desired form. Secured to the outer face of the arm $g$ is the driving gear $h$ for the odometer which is positioned substantially coaxial with respect to the odometer casing and held fixedly on the arm $g$ by means of suitable pins or rivets $h'$. In practice it has been found desirable to provide the driving gear or pinion $h$ with a hub section $h^2$ which may support an annular metal plate $i$ of substantially the same diameter as the threaded portion of the odometer cap or casing $d$. The plate $i$ is adapted to rest on the annular interior shoulder $c^3$ of the adapter $c$ and to be held firmly thereon by the inner end wall of the odometer cap or casing $d$, which in previous constructions seats directly on the annular shoulder $c^3$. The result of this arrangement is to secure the disk $i$ in the position indicated so as to rotate with the odometer cap or casing $d$ and to constitute in effect a wall between the interior of the adapter $c$ and the operating parts $d'$ of the odometer cap or casing. The hub $h^2$ of the gear $h$ rests loosely within the disk $i$ so that free relative rotation between the two is permitted, the gear being held against rotation as before pointed out, by the arm $g$. However, it is desirable that this fit should be as snug as is consistent with this free relative movement, in order that the function of the disk as a wall may be retained and the passage of foreign particles into the odometer casing prevented.

It is to be understood from the foregoing description, and it appears clearly from Fig. 1, that the metal plate $i$ must be positioned on the hub of the gear $h$ before the latter is secured to its supporting arm $g$ by the rivets $h'$. The gear $h$, when in operative position, is in mesh with a suitable gear $d^2$ connected operatively through suitable shafting $d^3$ to the operating parts of the odometer $d'$. It has been deemed unnecessary to illustrate in detail herein these connections since such parts are well known in the art.

It may be best in some constructions to engage the plate $e$ to the axle $a$ so that relative movement between the gear and the plate will be permitted, the complete disengagement of the plate and axle being prevented positively. In the construction shown, however, there are provided yielding means, such as a spiral spring $j$ disposed operatively between the gear $h$ and the plate $e$, to hold the pins $e'$ in the slot $a'$ of the axle. Further, in the present embodiment means have been provided to prevent excessive lateral movement of the studs $e'$ so as to prevent the latter from riding entirely out of the slot $a'$. Such means are illustrated as a removable cotter pin $k$ which passes transversely through the slot $a'$ and is disposed between the pins $e'$, thus serving to hold in place the bearings nut (omitted in the interest of clearness) and adapted as well to be engaged by the pins in case of excessive travel thereof laterally.

It is believed that the function of the driving connection will now be apparent but a brief outline of its arrangement with respect to the other parts may serve to emphasize some of the advantages realized by its employment. In use, the adapter $c$ is screwed on to the hub $b$. The pins $e'$, under the action of the spring $j$ are forced into the transverse slot $a'$ in the end of the axle $a$, when the pins are in alinement with the slot. The facility with which the driving connection may be put in place is one of its chief advantages, it being unnecessary to exercise any particular care in engaging the same with the axle. The inward movement of the plate $i$ to its final position, whether the odometer cap and adapter are assembled before or after the adapter is screwed onto the hub, of course, is made against the action of the spring $j$ which tends to press the gear $h$ and plate $i$ away from the plate $e$ and its connections $e'$ with the axle $a$. When the vehicle is started, the odometer cap or casing $d$ and the operating gear $d^2$ of the odometer rotate with the hub of the wheel, while the driving gear $h$ is held nonrevolubly in position through its connection to the nonrevoluble axle $a$, by the driving connection more particularly described hereinbefore. If the wheel be loose on its bearings either longitudinal or lateral movement thereof with respect to the axle will ensue. This movement or lost motion has been found sufficient in some instances to disconnect the axle from the driving connection or the odometer so that the operation of the latter is temporarily suspended. In the present construction, however, such movement will be compensated for by the yielding plate and link connection of the axle with the arm $g$, as will be understood. Accordingly this relative movement may occur to an improbable or excessive extent without affecting the operation of the odometer.

The primary function of the plate $i$, which should be particularly noted, is to prevent the passage of grease or foreign particles from the bearings or the interior of the adapter $c$ to the interior of the odometer cap or casing $d$. In previous constructions more or less grease and dust have found their way through the shaft bearing, with the result that the relatively delicate operating parts of the odometer become clogged with foreign particles and heavy grease and in time are rendered inoperative thereby. Such trouble is positively eliminated by the use of the plate $i$.

I claim as my invention:

1. A driving connection for hub odometers comprising a driving gear, a coupling member secured thereto and a second coupling member adapted to engage the axle, said coupling members being elastically connected to permit relative movement between the axle and the odometer in the direction of the axis.

2. The combination with a hub odometer and a cap therefor, of a gear mounted in the cap and connected to the operating parts of the odometer, and a driving connection comprising a nonrevoluble driving gear in mesh with the first named gear, a coupling member secured to the driving gear and a second coupling member adapted to engage the axle, said coupling members being elastically connected to permit relative movement between the axle and the odometer in the direction of the axis.

3. A driving connection for hub odometers comprising a driving gear, an arm secured to the driving gear and a plate adapted to engage the axle, the arm and the plate being elastically connected to permit relative movement between the axle and the odometer in the direction of the axis.

4. In combination with a hub odometer, driving means therefor, means to support the driving means in the odometer cap, a yielding connection between the driving means and the axle to permit relative movement between the axle and the driving means in the direction of the axis including an arm secured to the driving means, a plate in engagement with the axle, links hingedly connected to the plate and engaging loosely the arm to connect yieldingly the plate and the arm.

5. In combination with a hub odometer, a driving gear therefor, means to support the gear in the odometer cap, a yielding connection between the gear and the axle including an arm secured to the gear, a plate having projections on its inner face, a transverse slot in the end of the axle to receive said projections, means to connect yieldingly the plate and the arm and a spring disposed therebetween to hold the projections removably in the slot.

This specification signed and witnessed this 15th day of March A. D., 1913.

CURTIS HUSSEY VEEDER.

Signed in the presence of—

MARGARET NOONAN,
J. MILTON STILLSON.